US007110749B2

(12) United States Patent
Zellner et al.

(10) Patent No.: US 7,110,749 B2
(45) Date of Patent: *Sep. 19, 2006

(54) IDENTITY BLOCKING SERVICE FROM A WIRELESS SERVICE PROVIDER

(75) Inventors: Samuel N. Zellner, Dunwoody, GA (US); Mark J. Enzmann, Roswell, GA (US); Robert T. Moton, Jr., Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 493 days.

This patent is subject to a terminal disclaimer.

(21) Appl. No.: 09/740,372

(22) Filed: Dec. 19, 2000

(65) Prior Publication Data

US 2002/0077083 A1    Jun. 20, 2002

(51) Int. Cl.
*H04M 11/00* (2006.01)
(52) U.S. Cl. .............................. 455/414.1; 455/404.2; 455/411; 455/456.1
(58) Field of Classification Search ................ 455/414, 455/410–411, 456, 466, 414.1, 414.2, 456.1, 455/456.2, 456.3, 415, 404.2
See application file for complete search history.

(56) References Cited

U.S. PATENT DOCUMENTS

| 4,757,267 A | 7/1988 | Riskin ........................ 379/113 |
| 5,303,393 A | 4/1994 | Noreen et al. ................ 455/3.2 |
| 5,511,111 A | 4/1996 | Serbetcioglu et al. ......... 379/67 |
| 5,512,908 A | 4/1996 | Herrick ....................... 342/387 |
| 5,588,042 A | 12/1996 | Comer ........................ 379/59 |
| 5,596,625 A | 1/1997 | LeBlanc ...................... 379/60 |
| 5,610,973 A | 3/1997 | Comer ........................ 379/59 |
| 5,625,364 A | 4/1997 | Herrick et al. .............. 342/449 |
| 5,663,734 A | 9/1997 | Krasner |
| 5,701,301 A | 12/1997 | Weisser, Jr. ................. 370/428 |
| 5,712,899 A | 1/1998 | Pace, II ....................... 379/58 |
| 5,727,057 A | 3/1998 | Emery et al. ............... 379/211 |
| 5,771,283 A | 6/1998 | Chang et al. ............... 379/142 |

(Continued)

FOREIGN PATENT DOCUMENTS

EP    000964542 A2    12/1999

(Continued)

OTHER PUBLICATIONS

U.S. Appl. No. 09/606,534, filed Jun. 2000.

(Continued)

*Primary Examiner*—William Trost
*Assistant Examiner*—Brandon J. Miller
(74) *Attorney, Agent, or Firm*—Merchant & Gould

(57) ABSTRACT

Location-blocking and identity-blocking services that can be commercially offered by a service promoter, e.g., a cellular service provider or a web advertiser. In the identity-blocking service, the service promoter may disclose the current physical location of a mobile subscriber (i.e., a cellular phone operator) to a third party (e.g., a web advertiser) subscribing to the identity-blocking service. However, the service promoter may not send any identity information for the mobile subscriber to the third party. On the other hand, in the location-blocking service, the service promoter may disclose the mobile subscriber's identity information to the third party, but not the current physical location of the mobile subscriber. Blocking of the mobile subscriber's identity or location information may be desirable for privacy reasons, to comply with a government regulation, or to implement a telecommunication service option selected by the mobile subscriber. However, in the case of the mobile subscriber requesting emergency help, the service promoter may not block identity and/or location information. Instead, the service promoter may send all such information to the emergency service provider (e.g., the police or a hospital).

24 Claims, 6 Drawing Sheets

U.S. PATENT DOCUMENTS

| | | | |
|---|---|---|---|
| 5,794,210 A | 8/1998 | Goldhaber et al. | 705/14 |
| 5,819,155 A | 10/1998 | Worthy et al. | 455/2 |
| 5,838,774 A | 11/1998 | Weisser, Jr. | 379/92.02 |
| 5,852,775 A * | 12/1998 | Hidary | 455/404 |
| 5,875,401 A | 2/1999 | Rochkind | 455/466 |
| 5,961,593 A | 10/1999 | Gabber et al. | 709/219 |
| 6,028,921 A | 2/2000 | Malik et al. | 379/201 |
| 6,047,327 A | 4/2000 | Tso et al. | 709/232 |
| 6,085,086 A | 7/2000 | La Porta et al. | 455/432 |
| 6,091,956 A | 7/2000 | Hollenberg | 455/456.5 |
| 6,101,381 A | 8/2000 | Tajima et al. | 455/414 |
| 6,112,186 A | 8/2000 | Bergh et al. | 705/10 |
| 6,122,520 A | 9/2000 | Want et al. | 455/456.2 |
| 6,133,853 A | 10/2000 | Obradovich et al. | 340/905 |
| 6,138,003 A | 10/2000 | Kingdon et al. | 455/410 |
| 6,157,829 A | 12/2000 | Grube et al. | 455/414 |
| 6,184,829 B1 | 2/2001 | Stilp | 342/387 |
| 6,185,426 B1 | 2/2001 | Alperovich et al. | 455/456 |
| 6,208,866 B1 | 3/2001 | Rouhollahzadeh et al. | 455/456 |
| 6,259,405 B1 * | 7/2001 | Stewart | 342/457 |
| 6,311,069 B1 | 10/2001 | Havinis et al. | 455/456 |
| 6,317,718 B1 | 11/2001 | Fano | 705/1 |
| 6,321,092 B1 * | 11/2001 | Fitch et al. | 455/456.5 |
| 6,332,127 B1 | 12/2001 | Bandera et al. | 705/14 |
| 6,353,664 B1 | 3/2002 | Cannon et al. | 379/142.1 |
| 6,377,810 B1 | 4/2002 | Geiger et al. | 455/456 |
| 6,385,591 B1 | 5/2002 | Mankoff | 705/14 |
| 6,418,308 B1 | 7/2002 | Heinonen et al. | 455/414 |
| 6,421,441 B1 | 7/2002 | Dzuban | 379/221.09 |
| 6,442,391 B1 | 8/2002 | Johansson et al. | |
| 6,442,687 B1 | 8/2002 | Savage | 713/156 |
| 6,449,497 B1 * | 9/2002 | Kirbas | 455/564 |
| 6,463,533 B1 | 10/2002 | Calamera et al. | 713/163 |
| 6,470,378 B1 | 10/2002 | Tracton et al. | 709/203 |
| 6,477,382 B1 | 11/2002 | Mansfield et al. | 455/458 |
| 6,484,148 B1 * | 11/2002 | Boyd | 705/14 |
| 6,496,931 B1 | 12/2002 | Rajchel et al. | 713/168 |
| 6,505,046 B1 * | 1/2003 | Baker | 455/456 |
| 6,505,048 B1 | 1/2003 | Moles et al. | 455/456 |
| 6,505,049 B1 | 1/2003 | Dorenbosch | 455/456 |
| 6,522,876 B1 * | 2/2003 | Weiland | 455/414 |
| 6,526,275 B1 | 2/2003 | Calvert | 455/418 |
| 6,545,596 B1 | 4/2003 | Moon | |
| 6,546,257 B1 | 4/2003 | Stewart et al. | |
| 6,560,442 B1 | 5/2003 | Yost et al. | 455/67.1 |
| 6,560,461 B1 | 5/2003 | Fomukong et al. | |
| 6,594,482 B1 | 7/2003 | Findikli et al. | 455/411 |
| 6,618,474 B1 | 9/2003 | Reese | 379/142.17 |
| 6,618,593 B1 | 9/2003 | Drutman et al. | 455/456 |
| 6,628,928 B1 | 9/2003 | Crosby et al. | 455/77 |
| 6,628,938 B1 | 9/2003 | Rachabathuni et al. | 455/414 |
| 6,647,257 B1 * | 11/2003 | Owensby | 455/414.1 |
| 6,647,269 B1 | 11/2003 | Hendrey et al. | 455/456 |
| 6,662,014 B1 * | 12/2003 | Walsh | 455/456.2 |
| 6,675,017 B1 | 1/2004 | Zellner et al. | 455/456 |
| 6,738,808 B1 | 5/2004 | Zellner et al. | 709/223 |
| 6,819,929 B1 | 11/2004 | Antonucci et al. | 455/445 |
| 2001/0034709 A1 | 10/2001 | Stoifo et al. | 705/51 |
| 2002/0077130 A1 | 6/2002 | Owensby | 455/466 |

FOREIGN PATENT DOCUMENTS

| | | |
|---|---|---|
| WO | WO 98/19484 | 5/1998 |
| WO | WO 99/27716 | 6/1999 |
| WO | PCT/US01/22295 | 7/2001 |

OTHER PUBLICATIONS

U.S. Appl. No. 09/606,535, filed Jun. 2000.
U.S. Appl. No. 09/630,134, filed Aug. 2000.
U.S. Appl. No. 09/739,162, filed Dec. 2000.
U.S. Appl. No. 09/739,315, filed Dec. 2000.
U.S. Appl. No. 09/739,339, filed Dec. 2000.
U.S. Appl. No. 09/739,340, filed Dec. 2000.
"Wireless Application Protocol," Wireless Internet Today, Oct. 1999.
"An Introduction to SnapTrack™ Server-Aided GPS Technology," available at http://www.snaptrack.com/AtWork/ion.pdf.
"Signal Soft Wireless Location Services," available at http://www.signalsoftcorp.com/products/location_manager.html.
U.S. Appl. No. 09/740,373, filed Dec. 19, 2000.
U.S. Appl. No. 09/740,375, filed Dec. 19, 2000.
U.S. Appl. No. 09/740,414, filed Dec. 19, 2000.
U.S. Appl. No. 09/739,315, filed Dec. 19, 2000.
U.S. Appl. No. 09/630,134, filed Aug. 1, 2000.
U.S. Appl. No. 09/739,162, filed Dec. 19, 2000.
U.S. Appl. No. 09/739,340, filed Dec. 19, 2000.
U.S. Appl. No. 10/704,775, filed Nov. 12, 2003.
U.S. Appl. No. 10/819,940, filed Apr. 8, 2004.
U.S. Appl. No. 09/740,414, filed Dec. 19, 2000.
Official Action dated Nov. 10, 2003 in U.S. Appl. No. 09/740,414.
Final Official Action dated Apr. 21, 2004 in U.S. Appl. No. 09/740,414.
Official Action dated Oct. 5, 2004 in U.S. Appl. No. 09/740,414.
Official Action dated Jun. 21, 2004 in U.S. Appl. No. 09/739,315.
Final Official Action dated Feb. 9, 2005 in U.S. Appl. No. 09/739,315.
Official Action dated Nov. 10, 2003 in U.S. Appl. No. 09/739,162.
Official Action dated Mar. 9, 2004 in U.S. Appl. No. 09/739,162.
Official Action dated Sep. 9, 2004 in U.S. Appl. No. 09/739,162.
Official Action dated Feb. 12, 2003 in U.S. Appl. No. 09/630,134.
Final Official Action dated Jul. 10, 2003 in U.S. Appl. No. 09/630,134.
Official Action dated Jun. 7, 2004 in U.S. Appl. No. 09/630,134.
Official Action dated Jan. 13, 2005 in U.S. Appl. No. 09/630,134.
Official Action dated Mar. 12, 2004 in U.S. Appl. No. 09/739,340.
Official Action dated Dec. 10, 2004 in U.S. Appl. No. 09/739,340.
3rd Generation Partnership Project; Technical Specification Group Services and System Aspects; Functional Stage 2 Description of Location Services in UMTS (1999).
http://www.openwave.com/us/news_room/press_releases/2001/20010320 "Open Wave Announces Availability to End-to-End Set of Location Services for Wireless Internet".
U.S. Official Action dated Aug. 30, 2005 in U.S. Appl. No. 10/704,775.
U.S. Official Action dated Oct. 4, 2005 in U.S. Appl. No. 10/819,940.
Co-pending Application No. 11/252,039 filed Oct. 17, 2005.
U.S. Official Action dated Mar. 1, 2004 cited in U.S. Appl. No. 09/740,375.
U.S. Final Official Action dated Sep. 24, 2004 cited in U.S. Appl. No. 09/740,375.
U.S. Official Action dated Feb. 28, 2005 cited in U.S. Appl. No. 09/740,375.
U.S. Final Official Action dated Jul. 26, 2005 cited in U.S. Appl. No. 09/740,375.
Petronis, Scott, "Mapping Technology: The Common Thread," Wireless Review, vol. 17, No. 3, pp. 10-14, Feb. 1, 2000, ISSN: 1099-9248.
U.S. Official Action dated May 7, 2003 cited in U.S. Appl. No. 09/740,373.
U.S. Final Official Action dated Oct. 21, 2003 cited in U.S. Appl. No. 09/740,373.
U.S. Action dated Jan. 26, 2004 cited in U.S. Appl. No. 09/740,373.
U.S. Official Action dated Apr. 28, 2005 cited in U.S. Appl. No. 09/740,373.
U.S. Official Action dated Nov. 21, 2005 cited in U.S. Appl. No. 09/740,414.

* cited by examiner

IDENTITY BLOCKING SERVICE FROM A WIRELESS SERVICE PROVIDER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention broadly relates to communication services, and more particularly, to a telecommunication service that offers information about the location of a mobile subscriber to a third party without disclosing the identity of the subscriber to the third party.

2. Description of the Related Art

Telephone communication has seen a phenomenal growth since its inception because of its extreme usefulness in today's world. It is hard, and almost impossible, to conceive of a world without telephones. Telephones have become an integral part of a civilized society. Modern telephones include generic desk-top telephone units, cordless telephones and more advanced cellular telephones (or "cell phones"). In contrast to a cordless telephone unit, a cellular telephone allows portability in that a cell phone operator can use the cell phone many miles away from home and the use is supported by a sophisticated telecommunications system.

Because a cell phone imparts mobility to the user while on the phone, quick detection of the location of the cell phone is important in the event of fraud or when there is a need to locate a cellular telephone (and, hence, its user) that placed a phone call for emergency assistance, e.g., a "911 call." It is also desirable to locate the cell phone operator or mobile subscriber (MS) for marketing reasons, e.g., for targeting location-specific advertisements to the cell phone operator upon determining the location of the cell phone operator. For example, one or more stores in a shopping complex (e.g., a mall) may wish to inform the cell phone operator about any current promotions or offers when the cell phone operator is found to be in the vicinity of the shopping complex.

In a cellular telephone network operated by a wireless service provider (SP), a mobile switching center (MSC) may serve more than one cell-site. Therefore, to locate a cellular phone within the network, a switch engineer may need to manually visit the MSC location and identify the cell-site within which the cellular phone is operative. Such a process may not be efficient when there are a large number of cell phone operators and in the event of frequent fraudulent or "911" calls. Further, it is also possible that the cell phone operator may swiftly change cells if the detection of the cell phone location takes more than a few minutes and especially when the cell phone operator is located near a cell boundary. In such an event, the earlier cell identification may prove wrong and the whole process may be repeated to identify the new cell site to which the cell phone operator has moved.

It is known to locate a cellular telephone having a predetermined telephone number by using time difference of arrival measurements (on signals transmitted from the specific cell phone) at a multiplicity of cell-phone base-stations. However, a GPS (Global Positioning System) antenna and a corresponding GPS receiver need to be added to each base station for use in locating the cell phone in this manner.

It is also known to locate the source of radio transmissions (including cellular phone transmissions) within a multipath signal environment. A hand-held sensor unit with a built-in non-directional or omnidirectional antenna can be used to capture signal transmissions from the source of radio transmissions to be located. Phase change measurements and other calculations are performed during processing of the captured signals and the signal-emitting source (e.g., a cell phone) is then located based on the outcome of the processing.

Furthermore, the identity of the cell phone operator may already be known to the wireless service provider serving the cell phone. For example, the wireless service provider may request information about the identity of the mobile subscriber (e.g., name, gender, age, employment information, etc.) when the mobile subscriber signs up to operate the cell phone in the wireless service provider's network. In another configuration, the identity of the cell phone operator may be available to an Internet world wide web advertiser with the help of, for example, cookies. The web advertiser may employ cookies to store information about and preferences of individual mobile subscribers who access particular websites on the Internet using web browser-equipped cell phones. It is known that cookies are digital text files placed in the cell phone's memory by a web server when the cell phone operator visits a web site served by the web server. Cookies are commonly used to store registration data such as the user's (here, the mobile subscriber's) name and address, the user's preferences, and so on. Cookies make it possible for web servers to personalize information to fit the user's specific needs and preferences when the user is visiting a web site on the Internet.

A wireless service provider may wish to supply a mobile subscriber's location information to a third party (e.g., a web advertiser) as part of the service provider's marketing activity. Also, a web advertiser (or any other marketing entity) may send location-specific advertisements to a mobile subscriber upon being informed of the current location of the subscriber. Because of various reasons (e.g., privacy concerns), it may be desirable that the wireless service provider not disclose the mobile subscriber's identity to the third party when sending the subscriber's location information to the third party. It may also be desirable that the web advertiser not transmit the mobile subscriber's identity information when communicating with the mobile subscriber over the Internet.

Alternatively, it may be desirable that the wireless service provider block the mobile subscriber's location information while supplying the subscriber's identity information to a third party. For example, a cell phone operator may wish to receive operator-specific advertisements over the cell phone from the third party without having the third party know of the physical location of the operator. Similarly, it may further be desirable that the web advertiser block any reference to the mobile subscriber's current physical location when sending any subscriber-specific advertisements to the mobile subscriber over the Internet. It may also be desirable for any other (i.e., non-Internet) advertiser to not disclose the cell phone operator's current location in or through the messages communicated between the advertiser and the cell phone.

SUMMARY OF THE INVENTION

The present invention contemplates a method of providing an identity-blocking service, wherein the method comprises obtaining an identity of a user operating a wireless communication device; obtaining information about a location of the user; and transferring the information about the location of the user to a third party without disclosing the identity of the user to the third party. A wireless service provider (e.g., a cellular telephone service provider) may commercially offer the identity-blocking service to the user for a fee. The third party may be an advertiser (e.g., a web advertiser) that is desirous of sending advertisements, messages or data to the wireless communication device (and, hence, to the user of the wireless device). The identity of the user may be obtained from the user when the user signs up for a communication service that allows the user to operate the wireless communication device in the wireless service provider's telephone network. In one embodiment, the promoter of the identity-blocking service may charge a fee to the third party for supplying information about the location of the user.

The present invention further contemplates a method of sending an advertisement over a communication network to a user operating a wireless communication device, wherein the method comprises receiving first information about a location of the user; receiving second information about the identity of the user; searching a database containing a plurality of location-specific advertisements; selecting one of the plurality of location-specific advertisements based on one or more criteria pre-selected by the user; and sending the one of the plurality of location-specific advertisements to the wireless communication device over the communication network without transmitting the identity of the user therewith. The communication network may be one or more of the Internet, the PSTN (public switched telephone network), and a cellular telephone network. A web advertiser may commercially offer such an identity-blocking service to, for example, cellular phone operators (i.e., mobile subscribers).

The web advertiser may obtain identity and location information for the user by paying a fee to an information provider (e.g., a wireless service provider). Furthermore, the one of the plurality of location-specific advertisements may be sent over the communication network in the form of a TCP/IP (Transmission Control Protocol/Internet Protocol) message.

The present invention further contemplates a method of providing a location-blocking service, wherein the method comprises obtaining identity information for a user operating a wireless communication device; obtaining location information for the user; and transferring the identity information for the user to a third party without disclosing the location information for the user to the third party. As mentioned hereinbefore, the third party user may be an advertiser (e.g., a web advertiser) who is desirous of sending advertisements, messages or data to the wireless communication device (e.g., a cell phone) and, hence, to the user. A wireless service provider may offer the location-blocking service for a fee to the user. The location of the user may be obtained by monitoring and then analyzing one or more signals transmitted by the wireless communication device operated by the user. In one embodiment, the wireless communication device may be configured to supply the location information to the wireless service provider.

The present invention further contemplates a method of sending an advertisement over a communication network to a user operating a wireless communication device, wherein the method comprises receiving first information about the identity of the user; receiving second information about a location of the user; searching a database containing a plurality of user-specific advertisements; selecting one of the plurality of user-specific advertisements based on one or more criteria pre-selected by the user; and sending the one of the plurality of user-specific advertisements to the wireless communication device over the communication network without transmitting the second information about the location of the user therewith. A web advertiser may commercially offer such a location-blocking service to, for example, cellular phone operators (i.e., mobile subscribers). The web advertiser may send the one of the plurality of user-specific advertisements over the communication network in the form of a TCP/IP (Transmission Control Protocol/Internet Protocol) message.

The present invention also contemplates an unblocking option where the user may access on Internet a website for one or more service promoters to "unblock" disclosure of the user's identity and/or location information. In alternative embodiments, various identity-blocking and location-blocking services may "unblock" transmission of respective identity and/or location information when the user (or the mobile subscriber) dials an emergency phone number (e.g., "911") or indicates a desire to access an emergency service provider (e.g., a fire station, a hospital, or the police).

Blocking of a user's identity or location information may be desirable for privacy reasons, to comply with a government regulation, or to implement a telecommunication service option selected by the user. Information blocks may be implemented in hardware and/or software, and at various places in a communication arrangement. Various identity-blocking and location-blocking services require an advertiser to not disclose the user's identity and current location, respectively, in or through the messages communicated between the advertiser and the wireless communication device operated by the user.

BRIEF DESCRIPTION OF DRAWINGS

Further advantages of the present invention may be better understood by referring to the following description taken in conjunction with the accompanying drawings, in which.

DETAILED DESCRIPTION OF PREFERRED EMBODIMENTS

Figure 1:
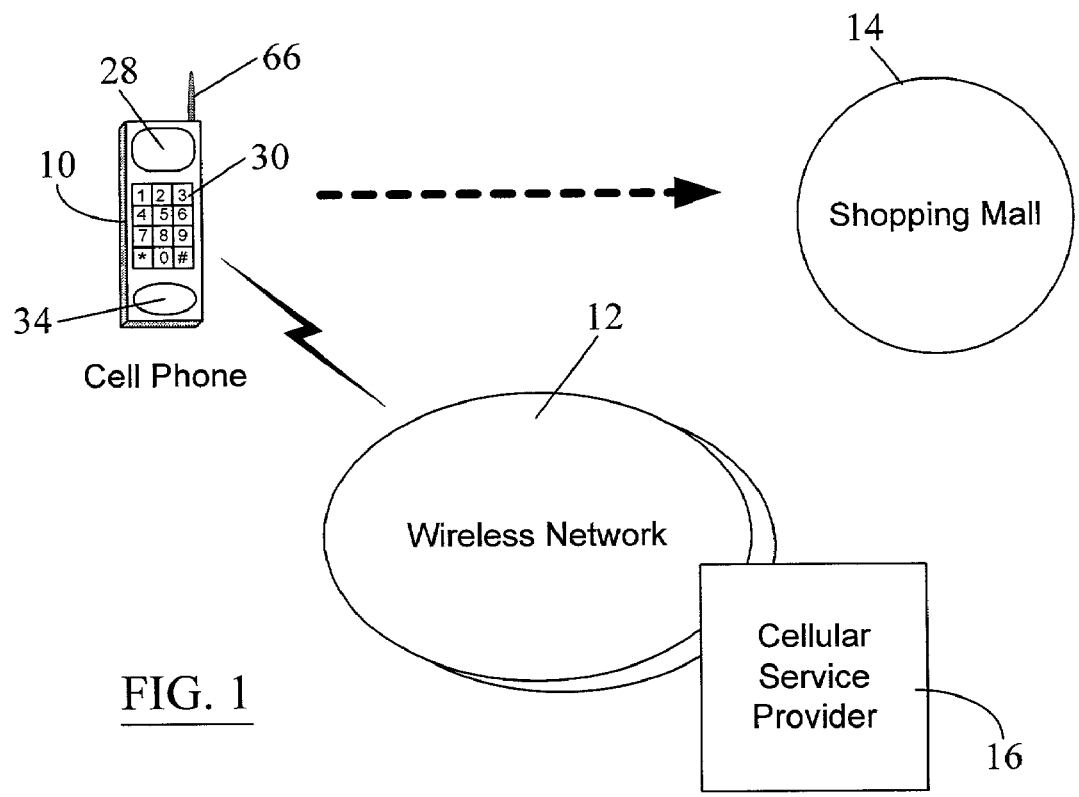
FIG. 1 illustrates interaction between a wireless device, such as a cell phone, and a wireless network to determine the cell phone location when the cell phone operator approaches a location.

FIG. 1 illustrates interaction between a wireless device, such as a cell phone 10, and a wireless network (or a cellular telephone network) 12 to determine the cell phone location when the cell phone operator approaches a location 14. The location 14 may be, for example, a shopping mall. It is to be understood that the cell phone 10 is powered on and is being carried by a cell phone operator or mobile subscriber (MS) approaching the location 14. It is also noted that the arrangement shown in FIG. 1 is for illustrative purpose only. In practice, the cell phone operator may visit a number of different locations (including, but not limited to, the location 14) carrying the cell phone 10. The location of the cell phone 10 may then be tracked at appropriate cell sites (not shown) in the wireless network 12 that the cell phone operator visits.

Figure 3:
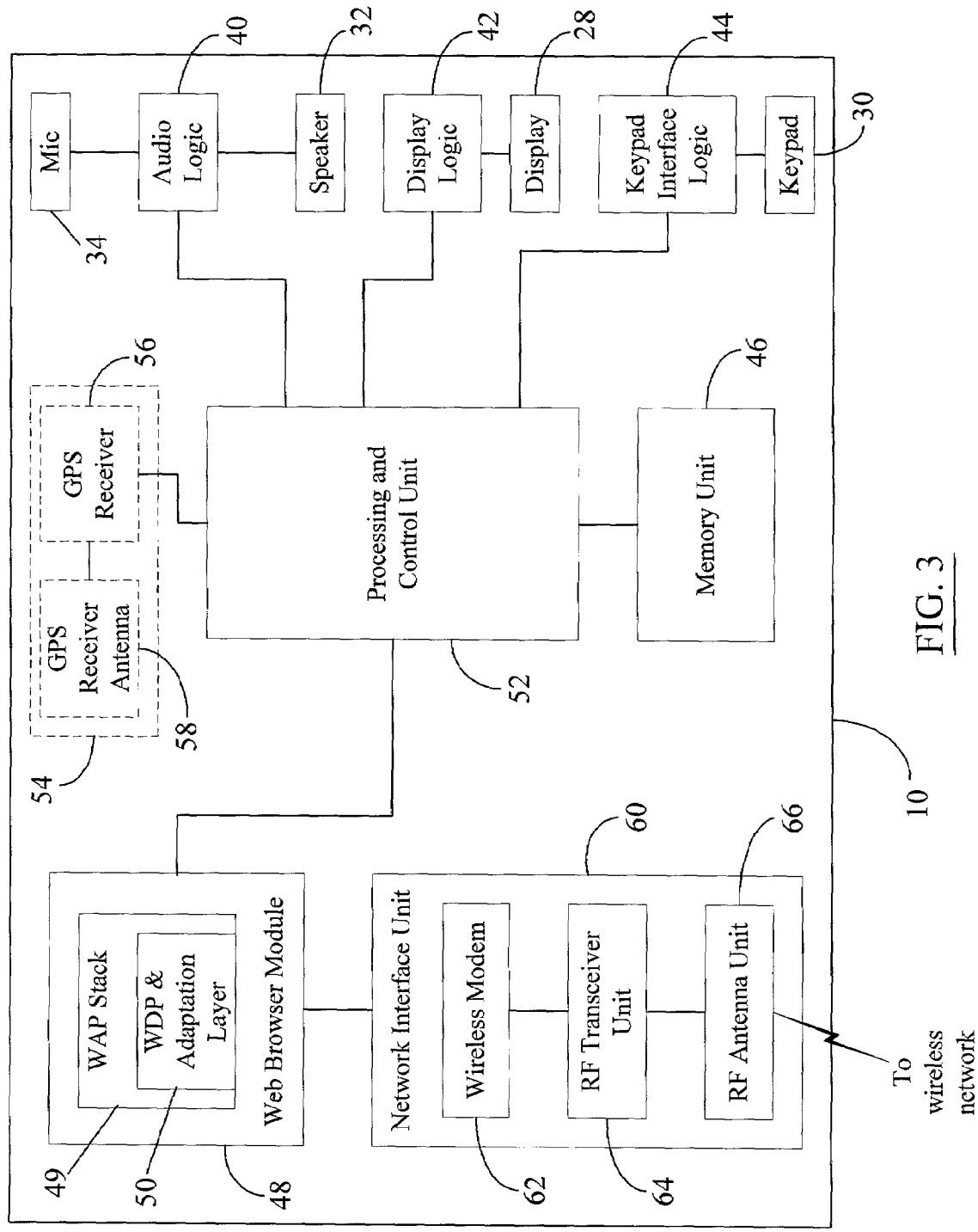
FIG. 3 is an exemplary block diagram showing circuit blocks constituting a web browser-equipped cell phone.

As discussed in more detail hereinbelow with reference to FIG. 3, the cell phone 10 may include a display screen 28, a keyboard 30, a microphone 34 and an RF (radio frequency) antenna 66. Additional circuit blocks constituting the cell phone 10 are shown in FIG. 3.

The location of the cell phone 10 may be determined periodically (i.e., at predetermined time intervals, e.g., every 30 seconds) by the wireless service provider or the cellular service provider (SP) 16. Through the arrangement shown in FIG. 1, the SP 16 may transmit user-specific or location-specific voice and/or data advertisements to the cell phone 10 as discussed hereinbelow with reference to FIG. 4. For cell phone location determination, the SP may employ one or more of the methods discussed in U.S. Pat. No. 5,512,908 ("the '908 patent") (issued on Apr. 30, 1996) and in U.S. Pat. No. 5,625,364 ("the '364 patent) (issued on Apr. 29, 1997), both of which are incorporated herein by reference in their entireties.

In the '908 patent, a cellular telephone having a predetermined telephone number is located by using time difference of arrival measurements (on signals transmitted from the specific cell phone) at a multiplicity of cell-phone base-stations. The '364 patent discusses locating the source of radio transmissions (including cellular phone transmissions) within a multipath signal environment. In the '364 patent, a hand-held sensor unit with a built-in non-directional or omnidirectional antenna is used to capture signal transmissions from the source of radio transmissions to be located. Phase change measurements and other calculations are performed during processing of the captured signals and the signal-emitting source (e.g., a cell phone) is then located based on the outcome of the processing.

Alternatively, the location determination may be made, for example, when the cell phone 10 registers with a particular cell site in the service provider's cellular network. The location data may be updated when the mobile subscriber is roaming as is known in the art.

The subscriber (carrying the cell phone 10) may, for example, park the subscriber's vehicle near the location 14 and may approach the location 14 on foot. In that case, an interpretation of the location data from the periodic location determination may imply that the subscriber has decided to visit the location 14. A third party advertiser (e.g., a web advertiser as discussed hereinbelow or a store in a shopping mall) or the service provider 16 itself may thus appropriately target advertisements to the cell phone 10 based on such indication of a stable location.

Alternatively, the MS may just drive around the location 14 and may not intend to park the car and visit the location 14. In that event, an interpretation of the periodic location data may imply that the cell phone 10 (and, hence, the mobile subscriber) is in continuous motion near or around a specific location (e.g., a mall) and the cell phone operator may not visit the location 14 at all. It may therefore be desirable for the third party advertiser or the service provider 16 not to send advertisements related to the location 14 because of the high probability that the cell phone operator may not visit the location 14.

FIG. 1 illustrates that the cell phone 10 is in wireless communication with the wireless network 12 using, for example, radio channels for voice and/or data communication. It is noted that the term "wireless network", as used herein, is contemplated to include analog or digital cellular mobile networks irrespective of the underlying transmission technology, e.g., CDMA (code division multiple access), TDMA (time division multiple access), etc., and any other radio network that employs intersystem messaging (e.g., the IS-41 based messaging scheme) as part of mobile wireless communication. The wireless network 12 may include a combination of one or more of, for example, an analog wireless network (e.g., the AMPS (Advanced Mobile Phone System) network), a digital wireless network including cellular networks (e.g., TDMA or CDMA-based wireless networks), a wireless LAN (Local Area Network) and a WLL (Wireless Local Loop) configuration. A portion of the wireless carrier network 12 may include one or more microwave links for satellite-based communication.

Furthermore, the SP 16 is shown as being part of the wireless network 12 because it is well known in the art that the wireless service provider 16 may operate in one or more of the cell sites (not shown) in the wireless network 12. In fact, the SP 16 may operate in almost all cell sites within the wireless network 12 (e.g., in the case of a national service provider) or, alternatively, the SP 16 may have operations within a select group of cell sites within the network 12 (e.g., in the case of a regional service provider).

In addition to the determination of the MS's location, the service provider 16 may also ascertain the identity of the mobile subscriber through, for example, the cell phone data (e.g., the mobile identification number or MIN) received by the SP 16 (e.g., through a mobile switching center operated by the SP 16) when the SP 16 authenticates the cell phone 10 as part of the cell phone registration process as is known in the art. The identity of the mobile subscriber (e.g., the subscriber's name, address, contact phone number, employment status, etc.), along with the associated MIN, may already have been previously stored in a database (e.g., the subscriber's home location register or HLR) maintained by the SP 16. Alternatively, the mobile subscriber identity information may temporarily reside in a visitor location register (VLR) associated with the serving MSC (mobile switching center) for a roaming MS. Such identity information may be obtained by the SP 16, for example, when the MS initially signs up for the cellular service offered by the SP 16.

In the discussion given hereinabove, the mobile subscriber's location and identity information may be considered to reside "in the network" as opposed to "in the cell phone." In the latter situation, a GPS (global positioning system) receiver-equipped cell phone (discussed hereinbelow with reference to FIG. 3) may monitor and record/update the cell phone location in a memory unit inside the cell phone 10. The user of the cell phone 10 may decide whether to release the stored location information to, for example, a web advertiser. If the user decides to block the user's current location information as part of the user's query to a web advertiser for certain information (as discussed hereinbelow with reference to FIG. 2), the web advertiser may "know" the identity of the user requesting information, but may not know where the user is located. Such an action may be necessary, for example, when the user wants to receive general information from the web advertiser on a topic of the user's choice, but without receiving location-specific advertisements.

Figure 2:
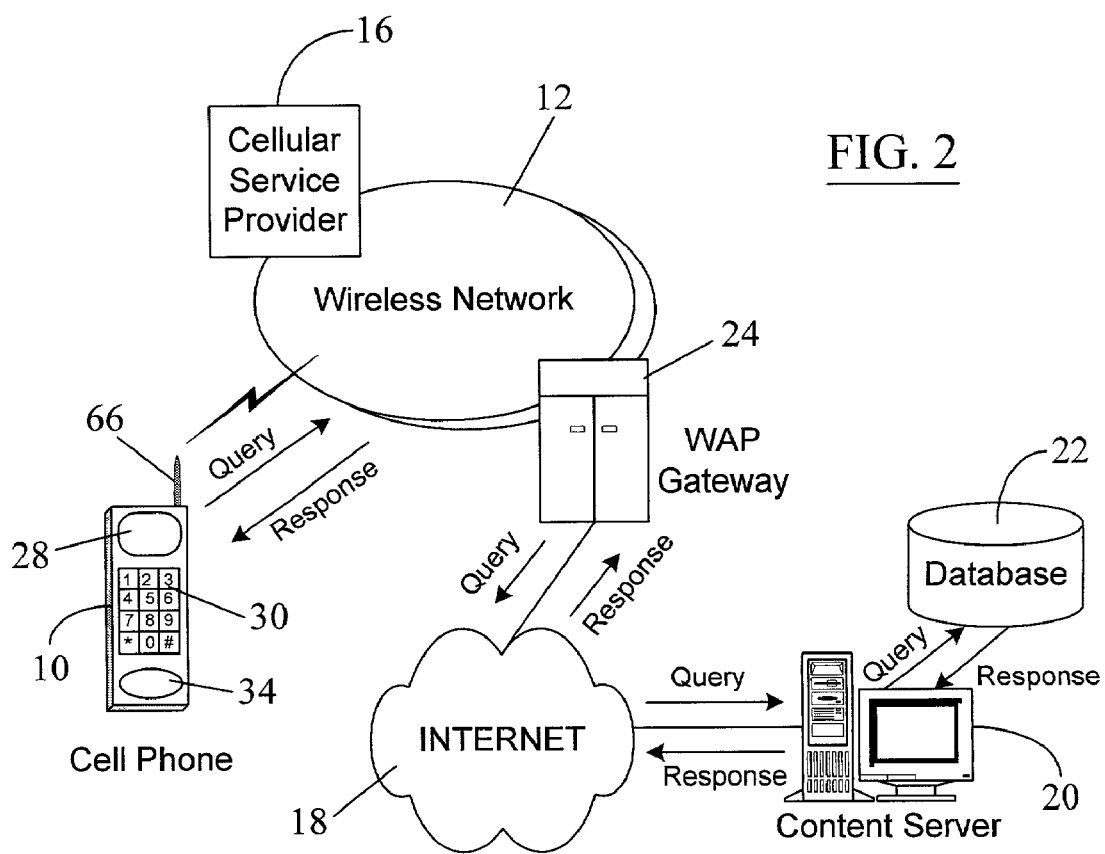
FIG. 2 shows an arrangement wherein the cell phone operator receives queried information or unsolicited advertisements over a combination of the wireless network and the Internet from a remote content server.

FIG. 2 shows an arrangement wherein the cell phone operator receives queried information or unsolicited advertisements over a combination of the wireless network 12 and the Internet 18 from a remote content server 20. The content server 20 is shown connected to the Internet 18 and may include a database 22 that stores varied information (e.g., news, weather information, shopping information, map directions, etc.). The database 22 may be physically located within the server computer 20 or, alternatively, the database 22 may be located away from the server 20. In the latter case, the server 20 may query the remote database 22 for the requisite information. In one embodiment, some or all of the information in the database 22 may be in a digital audio file format so as to allow the cell phone operator to listen to the information content over the speaker 32 (FIG. 3). The data in audio file format may include file extensions such as, for example, ".WAV" (wave file), ".AIFF"(Audio Interchange File Format), ".AU"(audio file), etc. Alternatively, a portion of the information in the database 22 may be in a digital text file format, e.g., in the HTML (Hyper Text Markup Language) format, in the ASCII (American Standard Code for Information Interchange) format, etc. The digital text files may be sent over the Internet 18 to the web browser residing in the cell phone 10 so as to display the user-requested information on the display screen 28 for the cell phone 10.

As illustrated in FIG. 2, the cell phone operator may access the Internet 18 to request information from the content server 20. The cell phone 10 may include a web browser (e.g., the web browser module 48 in FIG. 3) to access the Internet 18 via the wireless network 12. The information request may be sent (by the web browser 48) as a query message to the remote content server 20. The content server 20 may, in turn, forward the query to the database 22 to search and access the requested information. Upon retrieving pertinent information, the content server 20 may send the information to the cell phone 10 (i.e., to the web browser in the cell phone 10) via a response message over the Internet 18 as illustrated in FIG. 2. The query and response messages may include TCP/IP (Transmission Control Protocol/Internet Protocol) data packets for propagation over the Internet 18.

A WAP (Wireless Application Protocol) proxy/server 24 is also shown as part of the data transfer arrangement in FIG. 2. The WAP proxy/server 24 may facilitate access to the Internet 18 using the cell phone 10. The WAP proxy/server 24 translates WAP requests/queries transmitted by the web browser module 48 (FIG. 3) into WWW (World Wide Web) or Internet requests supported by the content server 20. The data packets (including information queries sent to the content server 20) generated or received by the web browser module 48 (using the WDP layer 50) may be in a WAP-supported format, e.g., the WML (Wireless Markup Language) format. The WAP proxy/server 24 receives the WAP requests sent by the web browser module 48 in the form of WDP (Wireless Datagram Protocol) datagrams adapted to be transmitted over the underlying physical carrier networks, e.g., the PSTN (Public Switched Telephone Network) (not shown), the Internet 18, etc. The WAP proxy/server 24 then sends appropriate WWW requests, e.g., in the HTML format, to the content server 20.

It is noted that the term "Internet", as used herein, may be construed to include portions of traditional wireline telephone networks, e.g., the POTS (plain old telephone system) or the PSTN. Additionally, other networks, e.g., a LAN (local area network), a WAN (wide area network), etc., may also form part of the Internet 18, as is known in the art, to propagate the query and response messages between the cell phone 10 and the content server 20.

The content server 20 may provide the requested data or information in a specific format, e.g., in the HTML format, in the WML format, etc., depending on its design and implementation. If the content server 20 provides information in WAP content (e.g., in the WML format), then the WAP proxy/server 24 may retrieve the information directly from the content server 20 via the Internet 18 and forward the retrieved information to the web browser module 48 (FIG. 3). However, if the content server 20 provides information in WWW content (e.g., in the HTML format), then a filter may be used to translate the WWW content into WAP content. For example, an HTML filter (not shown) placed between the WAP proxy/server 24 and the content server 20 may translate information or data received in the HTML format into that in the WML format. The WAP proxy/server 24 may receive this translated data from the HTML filter and deliver it to the web browser module 48 via the Internet 18.

In one embodiment, the WAP proxy/server 24 may itself contain the data and information requested by the web browser module 48 (FIG. 3). In that embodiment, instead of the content server 20, the WAP proxy/server 24 may itself provide the requisite data and information to the web browser module 48. Thus, the WAP proxy/server 24 may not access another content server, e.g., the content server 20, and may, instead, directly supply the requested information in a WAP-supported format, e.g., the WML format, to the web browser module 48 via the Internet 18. In this configuration, the WAP proxy/server 24 may function as an origin or gateway server (instead of a proxy) that responds to requests from the WAP client, i.e., the web browser module 48, directly.

Instead of the WAP browser discussed hereinbelow with reference to FIG. 3, the web browser module 48 may include an HTML browser (not shown). In a data transfer arrangement with the HTML browser, the WAP proxy/server 24 and the HTML filter (not shown) may not be necessary. Further, the content server 20 may be configured to transfer data in the HTML format so as to be compatible with the data format supported by the HTML browser in the web browser module 48. All other components in the data transfer arrangement may remain the same as that illustrated in FIG. 2. Thus, in view of the foregoing discussion of remote data transfer with a WAP browser, additional discussion of data transfer using an HTML browser is omitted to prevent repetition.

It is noted that one or more of the WAP proxy/server 24, the content server 20 and the database 22 (if separate from the content server 20) may be owned or operated by the cellular service provider 16. Alternatively, an independent third party (e.g., a web banner advertiser) may own or operate these servers to store and provide various information to users or subscribers.

In one embodiment, the cell phone operator may send a query over the Internet 18 to the content server 20 by first accessing (with the help of the cell phone 10) the web page for the content server 20 and entering the query therein. As part of the query, the cell phone operator may supply the operator's current physical location to the content server 20. However, the operator may not supply the operator's identity to the content server 20. In other words, the content server 20 may "know" where the operator is, but not who the operator is. For example, the cell phone operator may access the content server's 20 web site from a location on a highway to request information about nearby attractions, locations of food establishments, directions for further travel, etc. The cell phone operator may not specify his/her identity or personal choices (e.g., food preferences) to the content server 20. Thus, the content server 20 may not supply user-specific information to the cell phone operator. Instead, the cell phone operator may receive general location-specific information from the content server 20.

FIG. 3 is an exemplary block diagram showing circuit blocks constituting a web browser-equipped cell phone, e.g., the cell phone 10. The cell phone 10 includes a display screen (or "display") 28, a keypad or keyboard 30, a speaker 32 and a microphone 34. The keys or "buttons" on the keypad 30 may be provided as, for example, push-button keys or computer keyboard-type keys or membrane keys or any other suitable design configuration. The choice of the type of keys on the keypad 30 may thus depend on design and aesthetic considerations including, for example, the size, the weight and the desired physical contours for the cell phone 10. The display screen 28 may display text or graphic messages thereon. For example, when the mobile subscriber (MS) browses the Internet 18, the display screen 28 may display the content of web pages for the MS to look at. In one embodiment, the display screen 28 may be an LCD (liquid crystal display) display. In alternative embodiments, the display screen may be, for example, a TFT (thin film transistor) active matrix display or a touch-sensitive screen.

Additional circuit elements include an audio logic unit 40, a display logic unit 42, a keypad interface logic unit 44, a memory or storage unit 46, a web browser module 48 and a network interface unit (NIU) 60. These circuit elements are shown coupled to a processing and control unit (PCU) 52 that manages and controls various operations performed by these circuit elements. The NIU 60 may include a wireless modem 62, an RF (radio frequency) transceiver unit 64 and an RF antenna unit 66 so as to enable the web browser module 48 to transmit and receive digital information over the Internet 18 as discussed hereinbelow.

The audio logic unit 40 may be connected to the microphone 34 and the speaker 32. The speaker 32 may be activated by the audio logic unit 40 when, for example, the PCU 52 informs the audio logic unit 40 that the MS has initiated a telephone conversation. Voice messages may first be received by the PCU 52 (via the NIU 60) and the PCU 52 may transmit these signals to the audio logic unit 40 to be sent to the speaker 32 for generating audible sound. Alternatively, any digital audio files (e.g., from the content server 20) received by the cell phone 10 (using the NIU 60) over the Internet 18 may first be sent to the web browser module 48 to retrieve the audio file data therefrom. The browser module 48 may then send the audio data to the PCU 52, which, in turn, forwards the audio data to the audio logic unit 40 and eventually to the speaker 32 for audible playback.

The user of the cell phone 10 may speak into the microphone 34 to transmit the user's voice during, for example, a telephone conversation. The audio logic unit 40 receives the electrical audio signals from the microphone 34 and sends them to the PCU 52, which, in conjunction with the NIU 60 transmits the user's voice to the wireless network 12. In one embodiment, the PCU 52 may generate digital audio files from the analog audio signals received from the microphone 34. The browser module 48 may send TCP/IP messages over the Internet 18 containing these digital audio files so as to allow the MS to carry out voice communication over the Internet 18. The digital audio file formats may include file extensions such as, for example, ".WAV" (wave file), ".AIFF"(Audio Interchange File Format), ".AU"(audio file), etc.

The display logic unit 42 monitors and manages display functionality for the cell phone 10. The PCU 52 may generate proper commands and signals for the display logic unit 42, which, in turn, may control the display of visual information on the display screen 28. The display screen 28 may display various information such as, for example, an e-mail message received over the Internet 18, any data entered via the keypad 30 or an intimation of which action is being performed by the cell phone 10. For example, a message such as "ACCESSING THE INTERNET" may also be sent to the display logic unit 42 (to be displayed on the display screen 28) by the PCU 52 once the PCU 52 receives an indication from the web browser module 48 that Internet access is in progress. Other messages may also be conveniently displayed on the screen 28. For example, as soon as the user presses a key on the keypad 30, the corresponding digit, symbol or command may be displayed on the display screen 28 by the display logic unit 42.

The keypad interface logic 44 is coupled to the keyboard 30 and receives signals sent from the keyboard 30 when the user presses one or more keys thereon. The user may enter data such as, for example, a telephone number, a web address (e.g., the web address of the content server 20), an e-mail message, etc., using various keys on the keypad 30. The web browser module 48 may need a portion of such data to determine how to access the content server 20 over the Internet 18. Furthermore, the user may also prefer to enter personal information about the user, e.g., the user's name, the address of the user's contact location, any known medical condition, etc., using keys on the keypad 30 and store that personal information in the memory unit 46.

The keypad interface 44 transmits the signals received from the keyboard 30 to the PCU 52 for further processing. The PCU 52 decodes the received signals and accordingly instructs the appropriate circuit elements for necessary action. For example, when the user enters the user's personal information, the keypad interface logic 44 may send all the data to the PCU 52, which may instruct the memory unit 46 to store the received data therein. The PCU 52 may store the user's personal identification information in the memory 46 using one of a number of digital text formats, e.g., HTML (Hyper Text Markup Language) format, ASCII (American Standard Code for Information Interchange) format, XML (Extensible Markup Language) text file format developed by W3C (World Wide Web Consortium), etc.

In one embodiment, the cell phone 10 may include a text-to-speech (TTS) converter (not shown). The TTS conversion functionality may be implemented with appropriate software residing in the PCU 52. The TTS converter may work with an SGML (Standard Generalized Markup Language) format-based TTS markup language. The SGML format may be based on the ASCII text format. An example of an SGML-based TTS markup language includes the STML (Spoken Text Markup Language) developed by Lucent Technologies of Murray Hill, N.J., U.S.A. In that embodiment, the cell phone 10 may be configured to receive an e-mail or other messages in the SGML format over the Internet 18. The TTS converter may convert the received text file (in the SGML format) into an STML file that can be audibly played back by the audio logic unit 40. The user of the cell phone 10 can thus hear, in a synthesized voice, the content of the message sent in a digital text format.

The memory or storage unit 46 provides memory for storage of data, such as the user's personal information as discussed hereinbefore. The data stored locally in the memory unit 46 may be text, audio or video data and may include a number of digital file formats as described hereinbefore. For example, data that may be sent over the Internet 18 may be in the HTML or the WML (Wireless Markup Language) formats. The memory unit 46 may be located inside the cell phone 10 or, alternatively, may be supplied as a memory cartridge (not shown) that may be attached to the cell phone 10 at an appropriate adapter slot (not shown) provided on the housing for the cell phone 10.

The memory unit 46 may include volatile and/or non-volatile memory, such as RAM (Random Access Memory), ROM (Read Only Memory), EEPROM (Electrically Erasable Programmable Read Only Memory) or similar memory units. A volatile memory may lose the data stored therein if the power applied thereto is removed. The personal information about the user (as an audio file or as a text file) may be stored in the non-volatile portion of the memory 46. On the other hand, the content of a web page accessed through the web browser 48 may be stored in the volatile portion (or temporary storage) of the memory 46.

The web browser module 48 may include software code or routines which, when executed by the PCU 52, perform web browser functions upon execution. In one embodiment, the web browser module 48 may be implemented using a combination of software and hardware elements. The web browser software may include, for example, an HTML browser or a WAP (Wireless Application Protocol) browser because of the small size and portable nature of the cell phone 10 and because of the smaller display 28 and limited memory space (in the memory unit 46) available for the cell phone 10. The HTML browser may "read" information received or stored in the HTML format, whereas the WAP browser may be able to "read" information having WAP content (e.g., information in the WML (Wireless Mark-up Language) format). In the embodiment illustrated in FIG. 3, the web browser module 48 includes a WAP browser that wirelessly connects the cell phone 10 to the Internet 18.

The web browser 48 may be activated using one or more keys on the keypad 30 and may be used for surfing the world wide web portion of the Internet. The web browser module 48 interacts with the PCU 52 to execute necessary software routines for Internet access. The software routines, upon execution, activate the wireless modem 62 in the NIU 60 to accomplish dialed Internet access via the wireless network 12. In one embodiment, the web browser module 48 (including its hardware and/or software elements) may be a part of the PCU 52 and the PCU 52 may directly perform web browsing or information delivery over the Internet 18.

Inclusion of the web browser 48 within the cell phone 10 may result in a standardized information interface for the cell phone 10 because it dispenses with the need to have a proprietary format for information transmission, storage and display. The messages to and from the cell phone 10 need not have to be in a proprietary format, but, instead, may be in a generally available text format, e.g., the HTML format or the WML format. This allows for ease of Internet communication with the cell phone 10 because of the use of TCP/IP data packets over the Internet 18 for information exchange.

As noted hereinbefore, the web browser module 48 includes the WAP browser software represented as a WAP stack 49. The WAP architecture provides a scaleable and extensible environment for application development for mobile communication devices such as, for example, the cell phone 10. The WAP protocol is designed in the form of a layered architecture wherein each of the layers is accessible by the layers above, as well as by other services and applications running on the WAP platform. The WAP stack 49 has the application layer (not shown) at its top, which is successively followed by the session layer (not shown), the transaction layer (not shown), the security layer (not shown) and the transport layer, which is referred to as a WDP (Wireless Datagram Protocol) and Adaptation layer 50 in FIG. 3 (and interchangeably referred to hereinbelow as "the WDP layer" or "the adaptation layer" for the sake of clarity).

The WDP layer 50 is the lowest layer in the WAP stack that is in direct contact with a physical network carrying the WAP data. The WDP layer 50 operates above the data-capable bearer services supported by various physical networks. A bearer service is a data transport mechanism that carries the WDP protocols between two devices. Some examples of bearer services include, for example, SMS (Short Message Service), circuit switched data and packetized data. Examples of some physical networks that carry the bearer data include a GSM (Global System for Mobile Communications) or another TDMA-based (Time Division Multiple Access) wireless network, a wireline network (e.g., the PSTN or the Internet), etc. The WDP protocol can be mapped onto different bearers, with different characteristics. The adaptation layer 50 is the layer of the WDP protocol that maps the WDP protocol functions directly onto a specific bearer. Thus, operationally, the WDP layer 50 provides convergence between a given bearer service and the rest of the WAP stack 49. The content of the adaptation layer 50 may be different for each bearer depending on, for example, specific capabilities and characteristics of that bearer service.

In the embodiment of FIG. 3, the WDP and adaptation layer 50 in the WAP stack 49 may map WDP protocol functions onto the packetized data (i.e., the bearer service) supported by the wireless network 12 to facilitate communication between the web browser module 48 and the remote source of data (i.e., the content server 20). The WDP layer 50 may thus adapt the datagrams transmitted and received thereby to conform to the data transmission protocol specified by the physical data carrier network, i.e., the wireless network 12. As noted hereinbefore, the WAP browser in the web browser module 48 may communicate with the remotely-located source of data (e.g., the content server 20) using a WAP-supported data format, e.g., the WML format. For bearer services supporting IP (Internet Protocol), the WDP protocol may be UDP (User Datagram Protocol) that provides port-based addressing (e.g., source port, destination port, etc.) which may be combined with the segmentation and reassembly features of IP-based routing to implement a connectionless datagram service between two devices.

The PCU 52 manages and controls various operations performed by different circuit elements connected thereto. The PCU 52 functions as a centralized location to send and receive various commands and information. For example, the PCU 52 may receive a signal from the keypad interface logic 44 when the MS wishes to access the Internet 18. In response, the PCU 52 may execute the web browser software in the browser module 48 to initiate an Internet connection. The PCU 52 may receive content of a web page or an e-mail over the Internet 18 and may, in turn, instruct the display logic 42 to display the received web page or e-mail on the display screen 28. Alternatively, the PCU 52 may instruct the TTS converter (not shown) to audibly "play" a message text using the audio logic unit 40 and the speaker 32 as described hereinbefore. During web browsing, the PCU 52 may also execute audio and video data files received from the Internet 18 using the web browser module 48 and send appropriate audio and video signals to the audio logic unit 40 and the display logic unit 42 respectively.

The cell phone 10 may include some additional optional circuit elements such as, for example, a user location identifier 54 including a GPS (Global Positioning System) receiver 56 and a GPS receiver antenna 58. The GPS receiver antenna 58 may be provided on the cell phone 10 to continuously receive location signals from geo-stationary satellites and transfer those signals to the GPS receiver 56 to identify the current location of the cell phone 10 and, hence, the location of the user carrying the cell phone 10. Instead of a built-in location identifier 54, the cell phone 10 may be provided with a port (not shown) to receive an external location identifier (with or without the receiver antenna 58) that may be attached to the port when needed. The GPS location identifier 54 may perform better in an outdoor environment, e.g., when the user is on the road. In one embodiment, the user location identifier 54 may supply the PCU 52 with the requisite location information and the PCU 52, with the help of the web browser module 48 and the network interface unit 60 (described hereinbelow), may send the user location information over the Internet 18 to the content server 20. Alternatively, the PCU 52 may send the MS's location information to the cellular service provider 16 via the wireless network 12.

The network interface unit 60 provides an electrical interface for signals travelling between various circuit elements inside the cell phone 10 and a wireless carrier network, e.g., the wireless network 12 in FIG. 3. Data communication signals (including the TCP/IP messages) transmitted and/or received by the web browser module 48 may pass through the NIU 60 prior to reaching their appropriate destinations. The NIU 60 may provide signal amplification in, for example, a noisy signal environment.

The network interface unit 60 employs wireless devices to transfer data and information from the cell phone 10 over the Internet 18. An antenna, e.g., an RF (radio frequency) antenna 66, may be provided on the cell phone 10 to allow wireless data communication. Data communication may be accomplished via a wireless modem 62 using the wireless network 12. When the wireless network 12 is a cellular network (e.g., a TDMA-based wireless network or a CDMA-based wireless network), the wireless modem 62 may be capable of data transfer using the message format supported by the given cellular network.

The web browser module 48 in the cell phone 10 may be configured to transfer data over the wireless network 12 and, hence, the web browser module 48 may be connected to the NIU 60. The web browser module 48 in FIG. 3 includes a WAP browser, as described hereinbefore. However, a web browser module 48 with an HTML browser may be similarly configured to perform data transmission and reception operations using wireless devices. The cell phone 10 may also include a web browser module 48 with browser software that supports a content format that is different from HTML or WML such as, for example, the JavaScript scripting language. A cell phone may be conveniently designed to include such a web browser module for data communication.

The RF transceiver unit 64 sends RF signals to the RF antenna 66 for transmission to the wireless network 12 and receives RF signals from the RF antenna 66 and forwards them to the wireless modem 62 for further processing. The RF antenna 66 provides the necessary signaling interface between the wireless network 12 and the web browser module 48 that needs to access the wireless network 12.

The wireless modem 62 may perform necessary data encoding for the data received from the WAP browser in the web browser module 48 to prepare the data (e.g., a query message) to be sent to the wireless network 12 and eventually to the content server 20 over the Internet 18. A corresponding decoding may be performed by the wireless modem 62 upon receipt of data (e.g., a response message from the content server 20) from the RF transceiver unit 64 prior to sending the decoded data to the WAP browser (in the web browser module 48) for further processing. The RF transceiver unit 64 modulates data received from the wireless modem 62 to be transmitted over an RF transmission channel linking the cell phone 10 with the wireless network 12. This modulated data is then wirelessly transmitted to the wireless network 12 (and, hence, to the Internet 18) by the RF antenna unit 66. Upon reception of any data or information from the wireless network 12 (e.g., an e-mail message received over the Internet 18), the RF antenna unit 66 forwards the RF-modulated data to the RF transceiver unit 64, which demodulates the data and sends it to the wireless modem 62 for further processing and transfer to the WAP browser in the web browser module 48.

Figure 4:
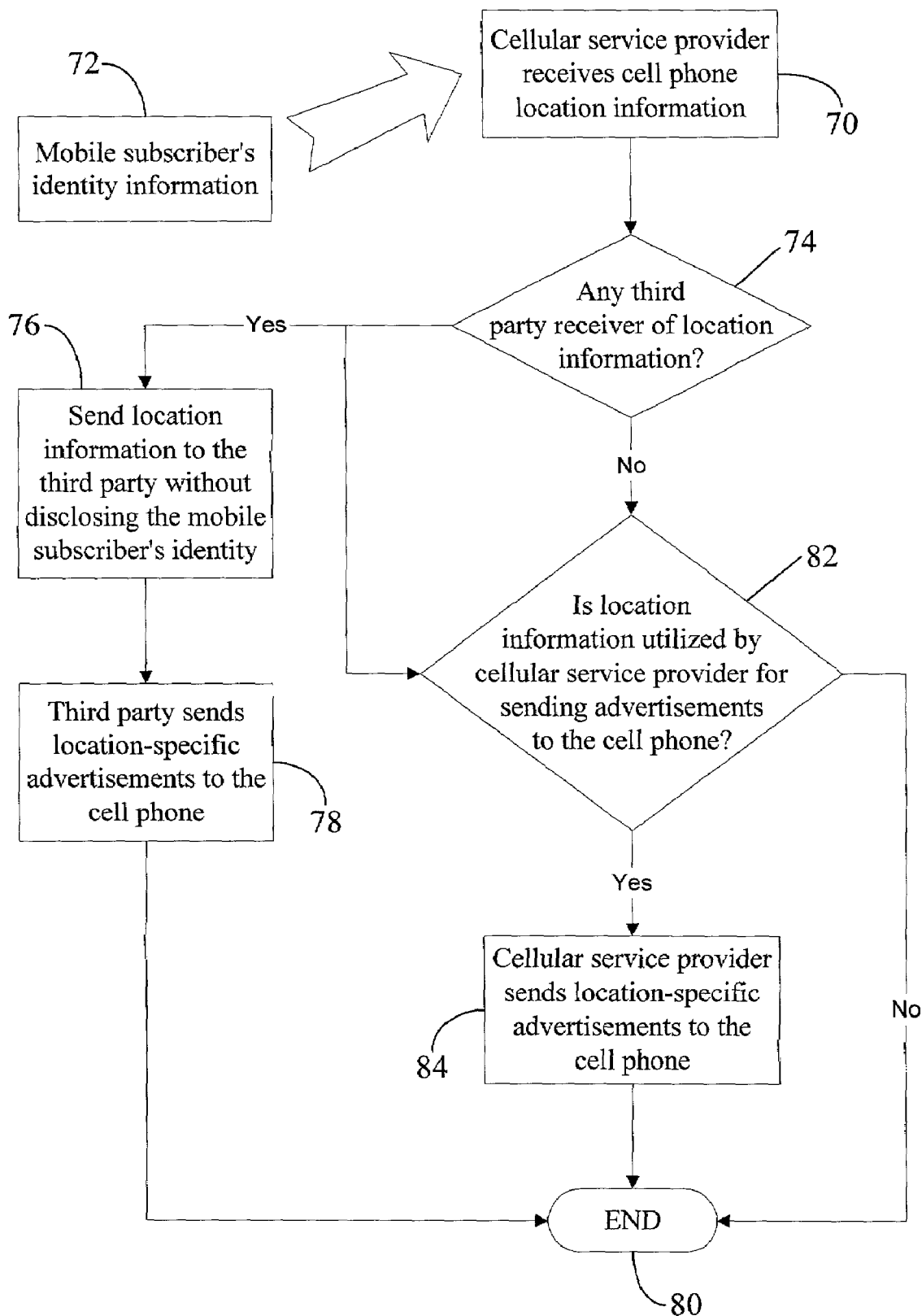
FIG. 4 depicts an exemplary flowchart for an identity-blocking service provided by a cellular service provider.

FIG. 4 depicts an exemplary flowchart for an identity-blocking service provided by a cellular service provider (e.g., the service provider 16 in FIGS. 1 and 2). Initially, at block 70, the cellular service provider 16 may periodically receive (or track) the location information for the cell phone 10 using one of the methods mentioned hereinbefore. Here, the location information can be considered to be "in the network." Alternatively, the location information may be "in the cell phone" as discussed hereinbefore. For example, a cell phone with a built-in location identifier (e.g., the cell phone 10 with the built-in GPS receiver 56 as shown in FIG. 3) may transmit its location information to the wireless network 12 (and, hence, to the service provider 16) periodically, for example, every 30 seconds after the cell phone 10 is activated (or powered up) by the MS. In another embodiment, the MSC (mobile switching center) (not shown) serving the cell phone 10 may be programmed to periodically "query" the cell phone 10 to extract current location information therefrom. In both cases, the PCU 52 may be configured with appropriate software which, when executed, transmits the cell phone location information via the NIU 60 to the MSC (not shown) operated by the service provider 16.

The service provider 16 may also receive the MS's identity information (e.g., name, address, services subscribed to, etc.) at block 72 when, for example, the MS first signs up for the cellular services provided by the SP 16. Alternatively, the MS may store subscriber's identity information in the memory unit 46 of the cell phone 10. The browser software in the web browser module 48 may be configured to transmit MS's stored identity information to the wireless network 12 whenever, for example, the MS initially accesses the Internet 18. The identity information received from the cell phone 10 may be temporarily stored in the MSC or any other convenient location within the cellular service provider's network.

The cellular service provider 16 may offer the cellular phone operator's location information to a third party advertiser (e.g., a web banner advertiser) for a fee, which may be fixed or based on per-delivery (of location information). In the identity-blocking service illustrated in FIG. 4, the service provider 16 first determines at block 74 whether any third party is qualified to receive the MS's location information. The third party, as discussed hereinbefore, may be a web advertiser who is desirous of sending web banner advertisements to the web browser module 48 to be displayed on the display screen 28. The contact data (e.g., web address, e-mail address, etc.) regarding each qualified third party receiver of location information may be stored by the SP 16 in appropriate database maintained thereby. The SP 16 may then transmit (at block 76) MS's location information to the third party advertiser without disclosing the MS's identity to the third party. In other words, the web advertiser operating the content server 20 may only know the location of the MS, but may not know the identity of the MS, i.e., who the MS is. The SP 16 may also charge a fee to the MS for blocking MS's identity from being disclosed.

Upon receiving the location information about the MS, the third party advertiser may search the database 22 to obtain advertisements for business establishments at or near the MS's current physical location. For example, when the cell phone operator approaches the location 14, e.g., a shopping mall (as shown in FIG. 1), the web advertiser may select advertisements for various shops in the mall. Thereafter, at block 78, the web advertiser may send over the Internet 18 (and via the wireless network 12) location-specific advertisements to the web browser 48 in the cell phone 10. The advertisements may be displayed as Internet banner advertisements on the display screen 28. Alternatively, one or more of the advertisements may be in a digital audio format and may be heard by the cell phone operator when the digital audio file (e.g., a streaming audio file) carrying the respective advertisement is executed by the PCU 52 and the resulting audio is played through the speaker 32. The web advertiser may continue sending different location-specific advertisements to the cell phone 10 as long as the cell phone 10 is "connected" to the Internet 18 (i.e., as long as the MS is surfing or accessing the Internet 18). The web advertiser may discontinue further advertisement transmission once the cell phone 10 is "disconnected" from the Internet 18 as indicated by block 80 in FIG. 4.

Protection of unnecessary dissemination of identity information of the cell phone operator may be desirable to prevent misuse or to preserve privacy of the operator. When the identity information is stored in the cell phone 10, the web browser module 48 or the PCU 52 may be configured with appropriate software that gives the cell phone operator an option whether to block the transmission of the operator's stored identity information to a remote web server (e.g., the content server 20) when the cell phone operator queries or accesses the remote server for information. In such a case, the mobile subscriber may provide an indication to the SP 16 during or prior to a phone call that the identity information may not be forwarded over the Internet 18 to the content server 20. In one embodiment, the SP 16 may not have mobile subscriber's identity information pre-stored therewith. Here, the cell phone 10 (through, e.g., the PCU 52) may supply the identity information to the SP 16 on a per-call basis and instruct the SP 16 to block further transmission of the identity information unless indicated otherwise by the MS.

The SP 16 decides at block 82 whether it wishes to send location-specific messages to the cell phone 10. In one embodiment, there may not be any third party receiver of location information, but the cellular service provider 16 itself may utilize the received mobile subscriber's location information to target location-specific advertisements to the cell phone 10. Alternatively, the SP 16 may also send location-specific advertisements or messages to the cell phone 10 even when there is a third party advertiser. For example, the content server 20 may send textual messages to the cell phone 10, whereas the service provider 16 (through the corresponding mobile switching center) may send audio messages to the cell phone 10. Both types of messages may be sent intermittently to the cell phone 10. This is depicted by block 84 in FIG. 4. When the SP 16 identifies the cell phone 10 operating in its system, the service provider 10 may target location-specific advertisements to the cell phone 10 according to a method disclosed in the U.S. Pat. No. 5,5888,042 (issued on Dec. 24, 1996), which is incorporated herein by reference in its entirety. It is noted that the service provider 16 may not transmit any location-specific advertisements or messages to the cell phone 10. In any event, the process ends at block 80.

In the discussion given hereinabove with reference to FIG. 4, it is noted that instead of the service provider 16 initiating transmission of location-specific messages to the cell phone 10, the MS may "query" the SP 16 for location-specific information. For example, the MS may send a query message to a special mobile number assigned by the SP 16. The query message may be a textual or a voice message. In case of a voice message, appropriate speech recognition software may be provided at the location processing the MS's query to identify the content of the MS's request. The SP 16 may, in response, send pre-recorded location-specific data in, for example, synthesized voice messages to the cell phone 10. Alternatively, the query message may contain no data, but the origination of the query message to the dedicated mobile number may indicate to the SP 16 that the MS has requested location-based information. The SP 16 may offer such request-response service to mobile subscribers for additional fees.

Figure 5:
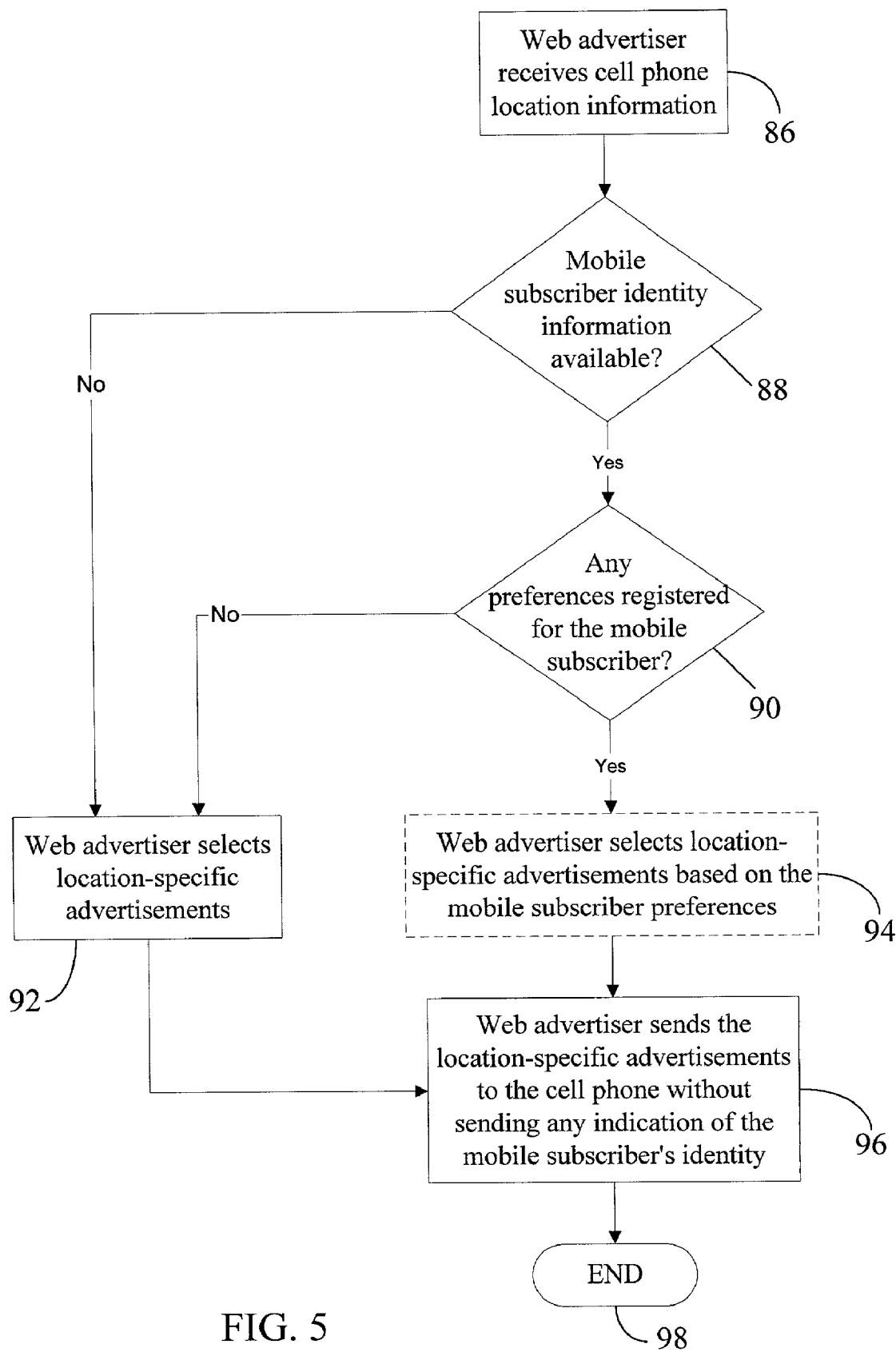
FIG. 5 shows an exemplary flowchart for an identity-blocking service provided by an Internet or web advertiser.

FIG. 5 shows an exemplary flowchart for an identity-blocking service provided by an Internet or web advertiser (e.g., the web advertiser operating the content server 20). In the identity-blocking service illustrated in FIG. 5, the web advertiser or any other third party advertiser blocks the mobile subscriber's identity information (if available) whenever the advertiser sends any location-specific message or advertisement to the cell phone 10. As discussed hereinbefore, the term "web advertiser" may include any third party (i.e., other than the wireless service provider 16) advertiser or message distributor over a communication network (e.g., the Internet 18) including, for example, the web advertiser operating the content server 20. The message from the web advertiser may be in a text form or in a digital audio file format—both with or without images. Further, the advertisement may appear on the screen 28 as a web banner advertisement.

At block 86, the web advertiser receives current physical location information of the cell phone 10. The web advertiser may purchase the location information from the SP 16 for each web access by the MS. Alternatively, the web advertiser may pay a flat sum of money to receive the MS's location information during a fixed duration (e.g., six months). In one embodiment, the web advertiser may receive the location information directly from the MS. Here, the MS may transmit the MS's current physical location information to the web advertiser's server (e.g., the content server 20) prior to or along with the query message (as shown in FIG. 2) from the cell phone 10. The web advertiser may also receive the IP (Internet Protocol) address for the cell phone 10 as part of the location information (from the SP 16 or from the MS). The IP address may be used to identify the MS as discussed hereinbelow. In an alternative embodiment, the web advertiser may even obtain the MS's current physical location information from another web advertiser.

The web advertiser may offer a service that provides location-specific advertisements, information or messages to the service's subscribers. In one embodiment, the MS operating the cell phone 10 may subscribe to this service, which may require the subscriber to provide its location information to the content server 20 and receive the requested location-specific data in return. For example, the MS may send a message (using the cell phone 10) to the content server 20 informing the server 20 of the MS's current location and asking the server to provide information about nearby movie theatres and directions thereto.

It is noted that the web advertiser may require each new visitor (e.g., the MS) to its web site to register and provide basic identity information (e.g., name, address, e-mail, etc.) for the visitor. Further, the web advertiser may "capture" the IP (Internet Protocol) address of the visitor's computer (here, the IP address for the cell phone 10) when the visitor initially visits the advertiser's website. The web advertiser may correlate the MS's IP address with the MS's identity information and store them in, for example, the database 22. Thereafter, upon receiving the cell phone location information (block 86) containing the MS's IP address, the web advertiser determines (at decision block 88) whether any identity information about the MS (and associated with the received IP address) is available therewith. The determination may be performed by appropriate software in, for example, the content server 20. The software may receive the IP address from the web browser module 48 when the cell phone 10 accesses the content server 20 over the Internet. Thereafter, the software may search the database 22 to identify the MS associated with the received IP address. In one embodiment, the web advertiser may receive the MS's identity information and associated IP address for the cell phone 10 from another web advertiser under, for example, an information-sharing agreement between the web advertisers.

The software in the content server 20 may also determine whether any advertisement preferences have been stored for the MS in the database 22 (decision block 90). At the time of registering or at any time thereafter, the MS may enter or update the MS's identity profile to include one or more preferences. For example, the MS may indicate a preference not to receive any advertisement from an automobile dealer even when the advertisement from the automobile dealership is a qualified location-specific advertisement. In other words, using the preference option, the MS may instruct the content server 20 to not transmit any automobile-related advertisement even when the automobile merchant is in the physical vicinity of the MS. Such preferences may be specified on the web advertiser's website for selection by the user (here, the MS). Alternatively, the content server 20 may provide the MS with an option to specify a limited number (e.g., five) of preferences that the content server 20 may take into account while selecting which location-specific advertisements to be sent to the cell phone 10. In one embodiment, the web advertiser (through the content server 20) may transmit a questionnaire to the MS to request input from the MS regarding what type of advertisements or messages the MS would like to receive from the web advertiser.

In the absence of identity information for the MS or in the absence of any preferences registered for the MS, the web advertiser may select, at block 92, location-specific advertisements for the MS based on the cell phone location information received at block 86. In one embodiment, the selection of the location-specific data, messages or advertisements may be performed by specific software in the content server 20. The software may search the database 22 and compare the received location data with the location information stored in the database 22 to identify or select appropriate messages to be sent over the Internet 18 to the cell phone 10. When the MS has registered one or more preferences with the web advertiser, the web advertiser may optionally select location-specific advertisements based on the MS's preferences as depicted by dotted block 94. Thus, the web advertiser may send location-specific advertisements that are also user-specific (or, user-preference-based). Alternatively, the web advertiser may send user-specific advertisements (whether based on user preferences or not) that are also location-specific.

Finally, at block 96, the web advertiser (i.e., the content server 20 operated by the web advertiser) may send one or more of the selected location-specific advertisements to the cell phone 10 without sending any indication of the mobile subscriber's identity therewith. Similarly, the web advertiser may also send user-specific advertisements to the cell phone 10 without sending any indication of MS's identity therewith. In other words, the content server 20 may block any MS identity information from further transmission over the Internet 18. Any interception of the location-specific advertisement or message sent from the content server 20 may serve to identify the present location of the receiver of the message, but not the identity of the receiver (i.e., who the receiver is). Protection of identity information of the MS may be useful when data packets get misdirected or intercepted over the Internet 18. Additionally, assurance of the protection of the MS's private information may allow the MS to frequently access the web advertiser's website, thereby generating more "hits" (and, hence, more advertising revenue) to the website. The web advertiser may even charge a fee to the MS for blocking MS's identity information from further dissemination. The identity-blocking process illustrated in FIG. 5 terminates at block 98.

As mentioned hereinbefore, the SP 16 may periodically send the MS's location information to the web advertiser (i.e., to the content server 20). However, in one embodiment, the SP 16 may send an indication (e.g., a pre-designated digit or code) to the server 20 when the location of the MS is continuously changing, i.e., when the MS is in motion or driving a car. Here, the MS may not intend to stop by at a particular location 14 (e.g., a shopping mall) and, therefore, it may not be desirable for the web advertiser to initiate any location-specific advertising. However, the web advertiser may still send location-specific advertisements (without MS identity information) to the cell phone 10 in response to any queries initiated by the MS.

As noted hereinbefore, the MS may be moving from one location to another (e.g., from one shopping mall to another). In one embodiment, the frequency with which the web advertiser may update or change the location-specific advertisements being sent to the cell phone 10 may depend on the frequency with which the web advertiser receives updated location information from the SP 16 serving the MS. Due to limited radio frequency bandwidth, the MS location determination by the SP 16 may not be continuous. Furthermore, the frequency of location determination may depend on the number of cellular phone operators active within the cellular service provider's network and for whom location determination has to be made by the SP 16.

In one embodiment, the identity blocking service provided by the cellular service provider 16 (as illustrated in FIG. 4) or a similar service provided by the web advertiser (as depicted in FIG. 5) may offer identity-blocking as a default option. However, the MS may be given an activation code (e.g., *25) that the MS may transmit from the cell phone 10 to remove the identity-blocking option. The SP 16 may even allow the MS to enter the activation code over the Internet 18 by visiting SP's website. Thus, the cellular service provider 16 may receive the activation code from the cell phone 10 at any time after the cell phone 10 is active (or, "turned ON"). Thereafter, the SP 16 may not block the MS's identity information and send the identity information along with the location information to the third party advertiser. Similarly, the web advertiser may also receive the activation code from the cell phone 10 instructing the content server 20 to release the MS's identity information with the location-specific messages. In one embodiment, the user (here, the MS) may need to enter the activation code on a per message or per website access basis. In another embodiment, the activation code may permanently remove the identity blocking option until the user revokes the user's choice.

In alternative embodiments of identity-blocking services by the cellular service provider 16 (FIG. 4) or by the web advertiser (FIG. 5), the identity-blocking option may be initially absent or disabled. In other words, the SP 16 or the web advertiser may not block MS's identity as a default service option. Instead, in these embodiments, the MS may be given a deactivation code (e.g., *34) that the MS may send to the SP 16 or the web advertiser to "enable" the identity-blocking option. Thus, after the MS "enables" the identity-blocking option, the SP 16 or the web advertiser may start blocking the MS's identity information as discussed hereinbefore with reference to FIGS. 4 and 5 respectively.

Figure 6:
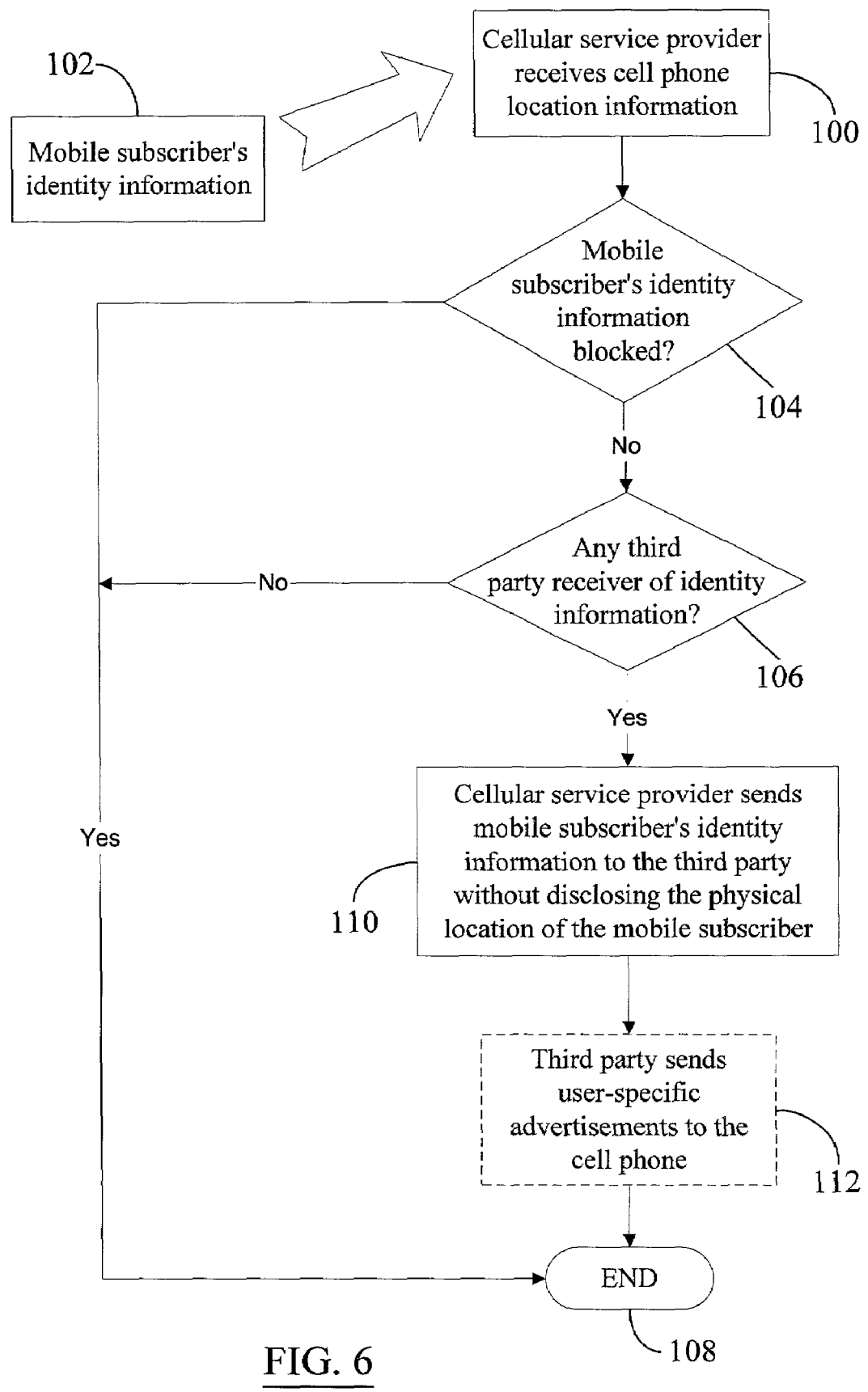
FIG. 6 is an exemplary flowchart for a location-blocking service provided by a cellular service provider.

FIG. 6 is an exemplary flowchart for a location-blocking service provided by a cellular service provider (e.g., the service provider 16 in FIG. 2). In the location-blocking service, the SP 16 may prevent transmission of the MS's location information to the third party advertiser, but may not block the transmission of the MS's identity information. Thus, the third party may "know" who is the receiver of the advertisements, but may not know where that receiver is located. A location-blocking option may be desirable for the MS who wants to receive only a selected group of messages regardless of the MS's location (e.g., messages informing the MS of the prices of stocks held by the MS). Here, the data, messages or advertisements to be sent to the MS may not depend on the MS's physical location.

At block 100, the cellular service provider 16 may receive physical location information for the cell phone 10 operated by the MS. The cellular service provider 16 may receive the location information as discussed hereinbefore with reference to block 70 in FIG. 4. Also, the SP 16 may also receive MS's identity information at block 102 in a manner similar to that described hereinbefore with respect to block 72 in FIG. 4. Therefore, further discussion for blocks 100 and 102 is omitted for the sake of brevity.

At decision block 104, the SP 16 determines whether the SP 16 has implemented the option of blocking the MS's identity (e.g., to comply with a government regulation) or whether the MS has indicated to the SP 16 (using, e.g., a pre-assigned code or symbol) to block the MS's identity information from being sent to a third party receiver. The determination function at block 104 may be performed by the content server 20 or by the MSC (not shown) serving the cell phone 10. Appropriate program code may be executed in the content server 20 or the MSC to make the determination at block 104. The SP 16 may also determine, at block 106, whether any third party advertiser or receiver of identity information has signed up or subscribed to receive the MS's identity information. As noted hereinbefore, the third party advertiser (e.g., a web banner advertiser) may pay predetermined fees on a per-user basis, i.e., for each new user identity information sent by the SP 16. Alternatively, the third party advertiser may pay a fixed amount of money for a given duration (e.g., six months) irrespective of the number of user whose identity information is received thereby. Further, the SP 16 may charge a fee to the MS for blocking MS's location information from further transmission. The process depicted in FIG. 6 terminates at block 108 in the event that there is no third party receiver of the MS's identity information or when the transmission of the MS's identity information is blocked (by the MS or by the SP 16 itself).

In the absence of any blocks placed on transmission of the MS's identity information and when a third party advertiser is available to receive the MS's identity information, the SP 16 may send, at block 110, the MS's identity information to the third party advertiser without disclosing to the third party advertiser the current physical location of the cell phone 10 being operated by the MS, thereby preventing the third party advertiser from knowing the physical location of the MS. In case of an arrangement similar to that in FIG. 2, the SP 16 may provide the identity information to a web advertiser (i.e., to the content server 20 operated by the web advertiser) as one or more TCP/IP data packets sent over the Internet 18. Alternatively, the SP 16 may send MS's identity information to the third party advertiser over a phone (e.g., as a voice mail) when a telephone connection (e.g., a wireline or a wireless telephone connection) exists between the SP 16 and the third party advertiser.

As noted hereinbefore, the MS's identity information may include, among other things, the MS's name, gender, age, profession, education, mailing address, etc. This information may then be used by the third party advertiser to select which advertisements or messages are to be sent to the MS. However, as noted hereinbefore, the MS may request specific information (e.g., prices of stocks held by the MS) from the third party advertiser and may also instruct the SP 16 not to disclose the MS's physical location while sending the MS's identity information to the third party advertiser. Here, the third party advertiser does not need to make any decision as to which advertisements to send to the MS. Instead, the third party advertiser may simply send the requested information from the database 22.

Thus, upon receiving the MS's identity information, the third party advertiser (e.g., a web advertiser) may optionally send user-specific advertisements, messages or data to the cell phone 10 as indicated by the dotted block 112. The web advertiser may have MS's user profile stored in the database 22 when, for example, the MS initially signed-up for user-specific message delivery service offered by the web advertiser. In the absence of a stored user profile, the content server 20 may search the database 22 with certain predetermined criteria (e.g., age, gender, profession, etc.) present in the identity information received from the SP 16 to select appropriate advertisements or messages to be sent to the MS. For the embodiment illustrated in FIG. 2, the third party advertiser (here, a web advertiser) may deliver advertisements or messages to the MS as TCP/IP data packets sent over the Internet 18. In one embodiment, the third party advertiser may dial the mobile number for the cell phone 10 and deliver audio messages to the cell phone 10. The location-blocking service may terminate at block 108 as illustrated in FIG. 6.

The third party advertiser may continue delivering user-specific messages, data or commercial advertisements in the location-blocking service illustrated in FIG. 6 for a fixed duration (e.g., two minutes). The length of the duration may be predetermined or may vary with user traffic. Thus, if the number of users the third party advertiser has to cater to increases, the rate at which old advertisements are replaced and new advertisements are sent to the users may decrease.

In one embodiment, the third party advertiser may continue delivering user-specific advertisements to the MS until the MS turns off or deactivates the cell phone 10, or until the cell phone 10 is "disconnected" from the Internet 18.

Figure 7:
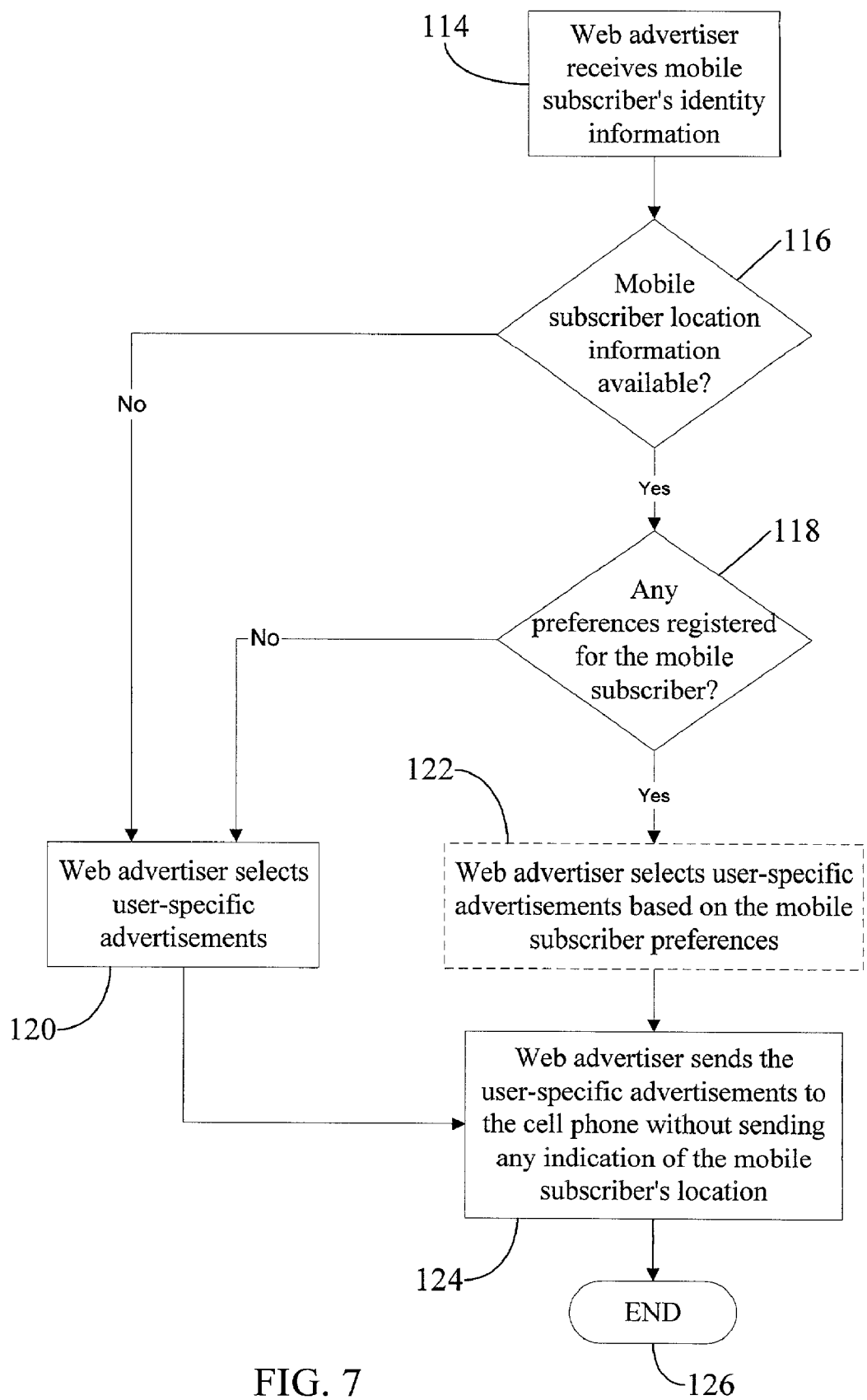
FIG. 7 illustrates an exemplary flowchart for a location-blocking service provided by an Internet or web advertiser.

FIG. 7 illustrates an exemplary flowchart for a location-blocking service provided by an Internet or web advertiser. The web advertiser receives MS's identity information at block 114. The web advertiser may receive this identity information in one of many ways (e.g., through purchase from the SP 16 or from any other web advertiser, or from MS when MS initially signs-up or subscribes to the location-blocking message delivery service from the web advertiser, etc.) discussed in detail hereinbefore with reference to block 88 in FIG. 5. Additional discussion therefore is omitted for the sake of brevity.

At decision block 116, the web advertiser determines (using, e.g., the content server 20) whether any current location information for the MS (i.e., for the cell phone 10 operated by the MS) is available in the database 22. The web advertiser may receive the MS's current physical location information in one or many ways (e.g., from the SP 16 on a subscription-basis, from the MS's cell phone 10, from another web advertiser, etc.) discussed in detail hereinbefore with reference to block 86 in FIG. 5. Therefore, further discussion for block 116 is omitted for the sake of brevity. Similarly, detailed discussion for decision block 118 (regarding the web advertiser's determination whether one or more preferences are stored in the database 22 for the MS) is omitted in view of discussion hereinbefore with reference to block 90 in FIG. 5. However, it is noted that the MS may register location-specific preferences with the web advertiser. For example, the MS may prefer to receive advertisements only from boat rental companies when the MS is present at or near a beach. Thus, the MS may qualify the MS's user preferences for specific regions or locations. In this situation (i.e., when the MS is at or near a beach), the web advertiser may not send advertisements from the restaurants on the beach even if the MS generally accepts advertisements from restaurants when in other locations.

When the cellular phone operator's (i.e., the MS's) location information is not available with the web advertiser or when no preference for the MS is registered with the web advertiser, the web advertiser may select, at block 120, user-specific (i.e., MS-specific) advertisements based on the identity information for the MS. Appropriate software in the content server 20 may search the database 22 to identify MS-specific advertisements. The software may use parameters such as, for example, age, employment status, gender, etc., to determine which advertisements to select from the database 22 for a given user. However, if one or more preferences for the MS are registered with the web advertiser (in, e.g., the database 22), then the web advertiser may select (from the database 22) MS-specific advertisements, messages or data based on those MS preferences as depicted by block 122. In one embodiment, the preference-based message selection may be optional as indicated by the dotted block 122. In other words, the web advertiser may ignore MS preferences in selecting user-specific advertisements from the database 22. A similar discussion for location-specific advertisements based on MS's preferences is given hereinbefore with reference to block 94 in FIG. 5.

At block 124, the web advertiser sends user-specific (i.e., MS-specific) advertisements, messages or data to the cell phone 10 without sending any indication of the MS's location therewith. The function at block 124 is similar to that described hereinbefore with reference to block 96 in FIG. 5, except that in the identity-blocking service depicted in FIG. 5, the identity information for the MS is blocked by the web advertiser instead of the location information as at block 124 in FIG. 7. Blocking of a cell phone operator's location information may be desirable, for example, for privacy reasons and for preventing unsolicited advertisements or messages from business establishments in the vicinity of the MS's current physical location. The web advertiser may even charge a fee to the MS for blocking MS's location information from further dissemination. The location-blocking service depicted in FIG. 7 terminates at block 126.

It is noted that the discussion given hereinbefore (with reference to FIGS. 4 and 5) about user-controlled activation or deactivation of identity-blocking option (using a code or a symbol) may equally apply to the location-blocking option (i.e., to block or to allow the transmission of the user's location information) described hereinbefore with reference to FIGS. 6 and 7. Therefore, further elaboration of user-controlled activation or deactivation of location-blocking option for FIGS. 6 and 7 is not provided herein.

In one embodiment, blocking of the MS's identity and/or location may be performed by the WAP proxy/server 24 instead of the SP 16. Here, the WAP server 24 may be configured with appropriate software that can detect and block relevant information (received from the SP 16 or from the cell phone 10) from being transmitted to the third party advertiser. The SP 16 or the cell phone 10 may not block any MS-specific identity or location information from further transmission. Instead, the SP 16 may send an appropriate numerical code, symbol or any other indication to identify to the WAP server 24 which of the message(s) originating from the SP 16 or from the cell phone 10 contains MS's identity and/or location information. The WAP server 24 may identify the information to be blocked and prevent that information from being sent to the third party advertiser (e.g., a web advertiser).

It is noted that various identity-blocking and location-blocking services described hereinbefore with reference to FIGS. 4–7 may "unblock" transmission of respective identity and/or location information when the MS dials an emergency phone number (e.g., "911") or indicates a desire to access an emergency service provider (e.g., a fire station, a hospital or the police). For example, the SP 16 may not block the MS's identity (e.g., as shown at block 76 in FIG. 4) when the MS dials "911". Here, the SP 16 may send location as well as identity information for the MS to the emergency service provider (e.g., police) as indicated by the dialed digits (i.e., digits "9", "1", "1"). Similarly, the WAP server 24 or the web browser module 48 (FIG. 3) may not block the MS's identity and/or location information when the MS places an emergency phone call.

The foregoing describes exemplary embodiments of various location-blocking and identity-blocking services that may be commercially offered by a cellular service provider or by an advertiser (e.g., a web advertiser). In the identity-blocking service, the service promoter may disclose the current physical location of a mobile subscriber (i.e., a cellular phone operator) to a third party (e.g., a web advertiser) subscribing to the identity-blocking service. However, the service promoter may not send any identity information for the mobile subscriber to the third party. On the other hand, in the location-blocking service, the service promoter may disclose the mobile subscriber's identity information to the third party, but not the current physical location of the mobile subscriber. Blocking of the mobile subscriber's identity or location information may be desirable for privacy reasons, to comply with a government regulation, or to implement a telecommunication service option selected by the mobile subscriber. Information blocks may be implemented in hardware and/or software, and at various places in a communication arrangement. However, in the case of the mobile subscriber requesting emergency help, the service promoter may not block identity and/or location information. Instead, the service promoter may send all such information to the emergency service provider (e.g., the police or a hospital).

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of providing an identity-blocking service, comprising:
   obtaining an identity of a user operating a wireless communication device, the identity including a name of the user;
   continuously obtaining, at pre-determined time intervals, first information about a location of the user; and
   continuously transferring the first information about the location of the user to a third party without disclosing the identity of the user to the third party, including the name of the user.

2. The method of claim 1, further comprising charging a fee to the user for blocking the identity of the user from being disclosed to the third party.

3. The method of claim 1, wherein the third party is an advertiser desirous of sending an advertisement to the wireless communication device.

4. The method of claim 1, wherein obtaining the identity of the user includes:
   requesting the user to provide second information about the identity of the user; and
   storing the second information about the identity of the user.

5. The method of claim 4, wherein requesting the user to provide the second information about the identity of the user is performed when the user signs up for a communication service that allows the user to operate the wireless communication device.

6. The method of claim 4, wherein requesting the user to provide the second information about the identity of the user is performed when the user signs up for the identity-blocking service.

7. The method of claim 4, wherein storing the second information includes maintaining a database to store the second information therein.

8. The method of claim 1, wherein continuously obtaining the first information about the first location of the user includes:
   continuously monitoring, at pre-determined time intervals, one or more signals transmitted by the wireless communication device operated by the user; and
   continuously determining, at pre-determined time intervals, the location of the user based on an analysis of the one or more signals.

9. The method of claim 1, wherein continuously obtaining the first information includes continuously receiving, at pre-determined time intervals, the first information about the location of the user supplied by the wireless communication device.

10. The method of claim 1, further comprising:
    monitoring the movement of the user operating the wireless communication device; and
    sending an indication to the third party when the user is found to be in a substantially continuous motion.

11. The method of claim 1, further comprising charging a fee to the third party for the first information about the first location of the user.

12. The method of claim 1, further comprising disclosing the identity of the user to an emergency service provider when the user requests emergency help.

13. The method of claim 1, further comprising allowing the user to unblock disclosure of the identity of the user to the third party.

14. The method of claim 13, wherein the user unblocks disclosure of the identity of the user over the Internet.

15. A method of providing information about a location of a user operating a wireless communication device, comprising:
    obtaining an identity of the user, the identity including a name of the user;
    continuously identifying, at pre-determined time intervals, the location of the user of the wireless communication device; and
    continuously transmitting the information about the location of the user to a subscriber desirous of sending an advertisement to the wireless communication device, wherein the transmission of the information about the location of the user excludes disclosure of the identity of the user, including the name of the user.

16. The method of claim 15, further comprising charging a fee to the user for preventing the disclosure of the identity of the user to the subscriber.

17. The method of claim 15, wherein obtaining the identity of the user includes:
    obtaining data about the identity of the user from the user; and
    maintaining a record of the identity data obtained from the user.

18. The method of claim 17, wherein obtaining the data from the user is accomplished when the user signs up for a communication service that allows the user to operate the wireless communication device.

19. The method of claim 15, wherein continuously identifying the location of the user includes:
    continuously monitoring, at pre-determined time intervals, one or more signals transmitted by the wireless communication device; and
    continuously determining, at pre-determined time intervals, the location of the user based on an analysis of the one or more signals.

20. The method of claim 15, further comprising charging a fee to the subscriber for supplying the information about the location of the user.

21. The method of claim 15, further comprising:
    continuously monitoring, at pre-determined time intervals, the movement of the user operating the wireless communication device; and
    continuously informing the subscriber at pre-determined intervals about changes in the location of the user.

22. The method of claim 21, wherein informing the subscriber is performed over the Internet.

23. The method of claim 15, further comprising disclosing the identity of the user to an emergency service provider when the user requests emergency help.

24. The method of claim 15, further comprising allowing the user to unblock over the Internet the disclosure of the identity of the user to the subscriber.

* * * * *